(12) United States Patent
Dedegil et al.

(10) Patent No.: US 8,708,160 B2
(45) Date of Patent: *Apr. 29, 2014

(54) DEVICE AND METHOD FOR FILTERING PARTICLES FROM A LIQUID IN A DISHWASHER

(75) Inventors: M. Yavuz Dedegil, Karlsruhe (DE); Rüdiger Eiermann, Syrgenstein (DE); Helmut Jerg, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 967 days.

This patent is subject to a terminal disclaimer.

(21) Appl. No.: 10/582,921

(22) PCT Filed: Dec. 9, 2004

(86) PCT No.: PCT/EP2004/053369
§ 371 (c)(1),
(2), (4) Date: Apr. 30, 2007

(87) PCT Pub. No.: WO2005/058124
PCT Pub. Date: Jun. 30, 2005

(65) Prior Publication Data
US 2008/0029463 A1    Feb. 7, 2008

(30) Foreign Application Priority Data
Dec. 18, 2003  (DE) .................... 103 59 617

(51) Int. Cl.
| | | |
|---|---|---|
| *B08B 13/00* | (2006.01) |
| *B08B 3/00* | (2006.01) |
| *B01D 29/00* | (2006.01) |
| *B01D 35/00* | (2006.01) |
| *B01D 39/00* | (2006.01) |
| *C02F 1/24* | (2006.01) |

(52) U.S. Cl.
USPC ..... 210/348; 210/500.1; 210/703; 210/221.2; 210/767; 134/25.2; 134/104.1; 134/57 D; 134/58 D; 134/110

(58) Field of Classification Search
USPC ................... 210/221.2, 703, 348, 767, 500.1; 134/25.2, 104.1, 57 D, 58 D, 110
See application file for complete search history.

(56) References Cited

U.S. PATENT DOCUMENTS 1,478,703 A * 12/1923 Dolbear ........................ 209/168
1,480,884 A *  1/1924 Dolbear ........................ 209/167
(Continued)

FOREIGN PATENT DOCUMENTS

DE         295 21 143           8/1996
DE       10250762 A1 *        11/2003
(Continued)

OTHER PUBLICATIONS

International Search Report PCT/EP2004/053369.

*Primary Examiner* — Thomas M Lithgow
(74) *Attorney, Agent, or Firm* — James E. Howard; Andre Pallapies

(57) ABSTRACT

A device is provided for filtering particles from a dishwashing fluid in a dishwashing machine, the dishwashing machine having a dishwashing container in which are disposed items to be subjected to the application of a dishwashing liquid thereto such that particles disentrained from the items during the application of a dishwashing liquid are entrained with the dishwashing liquid. The device includes a container operable to retain therein a predetermined quantity of a liquid mixed with at least one of a foam-forming substance and cleaning agents, the container including an arrangement for producing a flow of a gaseous fluid through the predetermined quantity of the liquid so as to generate a foam layer. The foam layer filters out from a dishwashing liquid passed through the foam layer a substantial fraction of particles entrained with the dishwashing liquid and such filtered-out particles are retained in the foam layer.

11 Claims, 1 Drawing Sheet

(56) References Cited

U.S. PATENT DOCUMENTS

| | | | |
|---|---|---|---|
| 5,122,267 A | 6/1992 | Giovanetti et al. | |
| 5,910,248 A * | 6/1999 | Tlok | 210/608 |
| 6,148,649 A | 11/2000 | Shin | |
| 6,413,366 B1 * | 7/2002 | Kemper | 162/60 |
| 8,197,607 B2 * | 6/2012 | Dedegil et al. | 134/10 |
| 2003/0052061 A1 * | 3/2003 | Burke | 210/703 |
| 2004/0256295 A1 * | 12/2004 | Britz et al. | 209/170 |

FOREIGN PATENT DOCUMENTS

| | | |
|---|---|---|
| GB | 2 096 456 | 10/1982 |
| WO | WO 99/43251 | 9/1999 |

* cited by examiner

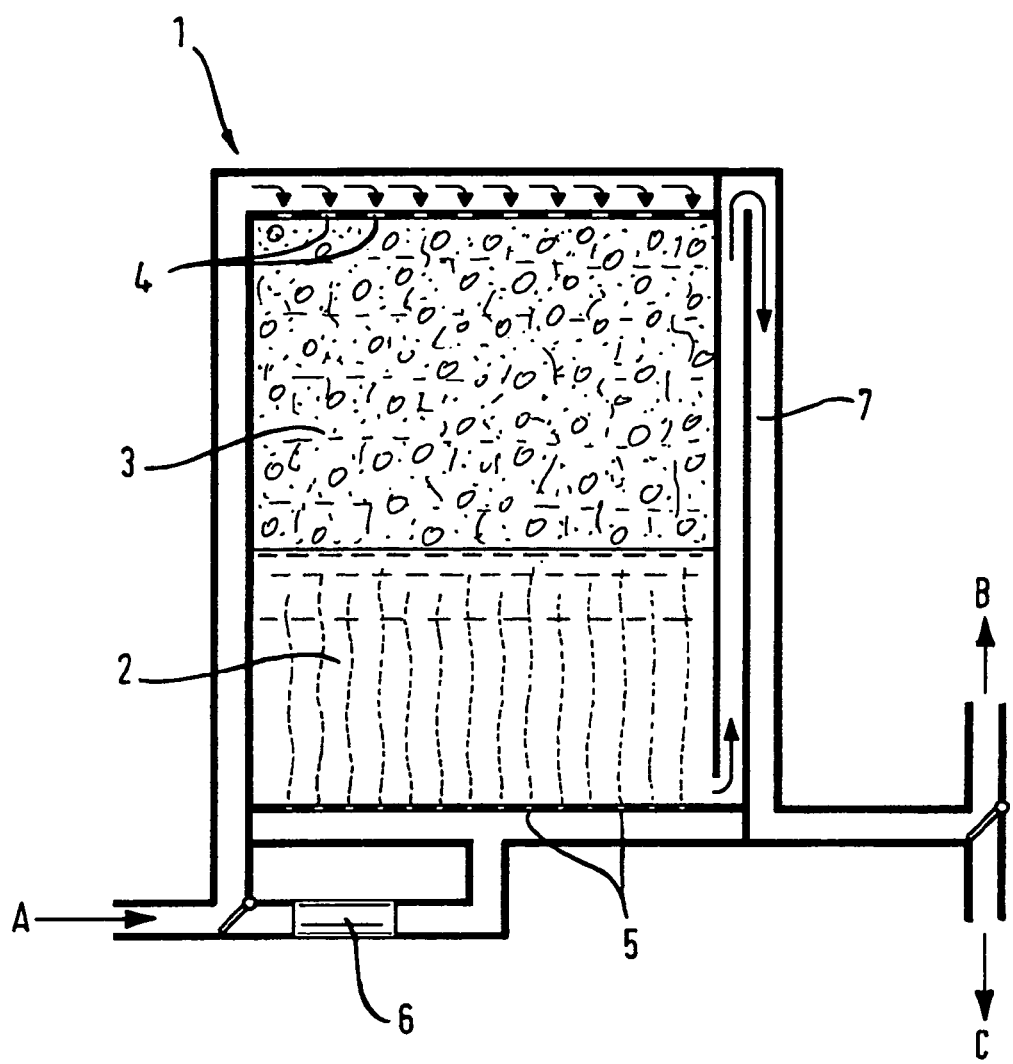

DEVICE AND METHOD FOR FILTERING PARTICLES FROM A LIQUID IN A DISHWASHER

The invention relates to a device and a method for filtering particles from a liquid in a dishwasher.

Mechanical filters, for example, comprising a lattice network or a metal film with pores, have long been known for filtering particles from a liquid, especially a dishwashing fluid. The operating mode of these filter devices is substantially determined by the surface condition and the pore size of the filter. For cleaning these rigid filter devices, for example, flow reversal can be effected whereby any particles adhering in the filter device are removed and transported away from the dishwasher.

Since the size of the pores substantially influences both the filter capacity and the cleanability, in conventional dishwashers a pore size is selected which ensures the filtering of small particles and also a good cleanability. Nevertheless, despite multistage filter devices, it is not possible to filter out fine and superfine particles such as food residue, for example, from the circulating dishwashing fluid in conventional dishwashing machines. These particles are therefore continuously circulated and are only removed in part from the circulating cycle into the waste water at the end of the washing program, for example, during the clear rinsing.

It is thus the object of the present invention to provide a device and a method whereby fine and superfine particles can be filtered out from the dishwashing fluid of a dishwashing machine.

This object is achieved by the device according to the invention having the features according to claim 1 and by the method according to the invention having the features according to claim 6. Advantageous further developments of the present invention are characterised in the dependent claims 2 to 5.

The device according to the invention for filtering particles from a dishwashing fluid in a dishwashing machine comprises a container into which a predetermined quantity of a liquid mixed with a foam-forming substance and/or cleaning agents is introduced and the container comprises means whereby a gaseous fluid flows through the liquid mixed with a foam-forming substance and whereon liquid mixed with a foam-forming substance forms a foam layer which exhibits filter properties so that a substantial fraction of the particles is filtered out in this foam layer and remains in this foam layer.

Advantageously, the means are constructed in the bottom area of the container and comprise openings through which a fine-beaded gas, for example, atmospheric air can flow. Appropriately provided in the upper area of the container are means through which dishwashing fluid provided with particles can flow in.

The method according to the invention is used during usage of the device according to the invention. The method for filtering particles from a quantity of liquid, especially the dishwashing liquid, substantially comprises the following steps:

1. A predetermined quantity of a liquid mixed with a foam-forming substance and/or cleaning agents is introduced into a container.

2. A gaseous fluid, for example, atmospheric air, is passed through openings in the bottom area of the container.

3. As a result of the different density conditions, the gaseous fluid flows rapidly through the pre-determined quantity of liquid mixed with a foam-forming substance and/or cleaning agents and forms a foam layer. This foam layer is formed so that it floats on the surface of the pre-determined quantity of liquid in the upper area of the container.

4. The dishwashing fluid permeated with particles, especially food residue trickles through appropriate means from above onto the foam layer formed so that the particles remain in the foam layer while the liquid, i.e. the dishwashing fluid flows past the foam bubbles or therethrough and enters into the liquid-filled container substantially cleansed.

5. The substantially fine and superfine particles collect in the foam layer and are led off at the end of the method according to the invention and removed by suction by means of the discharge pump.

The level in the container is appropriately held at a height by means of valve devices or a communicating pipe so that the height of the foam layer remains substantially the same while carrying out the method according to the invention. In one variant of the method according to the invention, the thickness of the foam layer can be varied, i.e. is embodied as adjustable in height. By metering the foam-forming substance, a foam layer of different thickness can be achieved, which is matched to the respective degree of contamination of the dishwashing fluid. For example, if a very small quantity of the foam-forming substance is added to the container by means of the dosing device, a thin foam layer is formed which can only absorb a small quantity of particles. However, if a larger quantity of the foam-forming substance is added to the container, a thicker foam layer is formed whereby larger particles or a larger number of particles can be filtered out. The requirement for foam-forming substance can be determined by means of a turbidity sensor, for example, which detects the turbidity of the dishwashing solution, and thus regulates the thickness of the foam layer.

It can be appropriate if the foam is formed continuously by means of the ascending gas bubbles while carrying out the method according to the invention or at intervals. The dishwashing fluid cleansed by means of the method and device according to the invention is supplied by means of corresponding valve and pipe systems of the circulating pump and can thus result in substantial saving of the quantities of water required.

A preferred embodiment of the device according to the invention is explained in detail hereinafter with reference to a drawing.

FIG. 1 shows a cross-section through a device according to the invention. The container 1 is preferably located in the lower area of the washing container but can also be arranged in another area of the dishwasher. A liquid 2 mixed with a foam-forming substance is introduced into the container 1 and a gaseous fluid 2, preferably atmospheric air, flows by means of a corresponding device 6 through openings 5 located in the bottom area of the container 1. Furthermore, the dishwashing fluid permeated with cleaning agents and possibly with food residues has properties similar to those of a liquid 2 mixed with a foam-forming substance and thus can also be used for foam formation. The dishwashing fluid enriched with cleaning agents and possibly also with food residues thus forms a liquid 2 mixed with cleaning agents.

When the gaseous fluid flows through the liquid 2 mixed with a foam-forming substance or the dishwashing liquid with food residues, a foam layer is formed, this being located on the surface of the liquid mixed with a foam-forming substance or the dishwashing fluid with food residue.

The dishwashing fluid contaminated with particles, especially food residue, is transported by the circulating pump via the path A to the means 4 and rains through these means 4, embodied as openings, onto the foam layer 3 whereby the particles located in the dishwashing solution, especially food residue, adhere to the foam bubbles and the cleaned dishwashing solution flows into the liquid mixed with foam-forming substance located therebelow.

The dishwashing solution thus cleaned is removed via the pipe system 7, the cleaned fraction being passed back via the path C into the washing cycle of the sump and after the dishwashing fluid has been cleaned, the contaminated foam and the remainder of the liquid flows along path C to the discharge pump and is removed there.

The invention claimed is:

1. A dishwashing machine comprising:
   a dishwashing container adapted to contain items to be subjected to the application of a dishwashing liquid thereto such that particles disentrained from the items during the application of a dishwashing liquid are entrained with the dishwashing liquid,
   a device for filtering particles comprising: a container operable to retain therein a predetermined quantity of a liquid mixed with at least one of a foam-forming substance and cleaning agents, the container including means for producing a foam layer with the foam layer having filter properties in that the foam layer filters out from a dishwashing liquid passed through the foam layer a substantial fraction of particles entrained with the dishwashing liquid and such filtered-out particles are retained in the foam layer.

2. The dishwashing machine according to claim 1, wherein the means for producing a flow of a gaseous fluid are disposed in a bottom area of the container.

3. The dishwashing machine according to claim 1, wherein the means for producing a flow of a gaseous fluid includes apertures in a bottom sheet of the container.

4. The dishwashing machine according to claim 1, further comprising means disposed in an upper area of the container operable to guide dish washing fluid having particles entrained therewith into contact with the foam layer.

5. The dishwashing machine according to according to claim 1, wherein the container includes valve means in a bottom area of the container through which both the cleaning dishwashing fluid and the contaminated foam flow away separately.

6. A method for filtering particles from a quantity of liquid in a dishwashing machine, the method comprising: generating a foam layer with the foam layer having filter properties in that the foam layer filters out from a dishwashing liquid passed through the foam layer at least a fraction of particles entrained with the dishwashing liquid; and trickling a dishwashing liquid having particles entrained therewith downwardly through the foam layer, wherein at least a fraction of the particles are retained in the foam layer, while collecting below the foam layer the quantity of dishwashing liquid from which the fraction of particles have been disentrained.

7. The method according to claim 6 and further comprising removing via suction foam that has been contaminated due to its entrainment of particles.

8. A device for filtering particles from a dishwashing fluid in a dishwashing machine, comprising: a container structured to retain therein a predetermined quantity of liquid mixed with at least one of a foam-forming substance and cleaning agents; a metering device structured to produce a flow of a gaseous fluid through the predetermined quantity of liquid so as to generate a foam layer with the foam layer having filter properties in that the foam layer filters out from a dishwashing liquid passed through the foam layer a substantial fraction of particles entrained with the dish washing liquid and such filtered-out particles are retained in the foam layer; and a turbidity sensor structured to detect a turbidity of the dishwashing liquid, wherein the metering device is further structured to vary the foam layer to match a degree turbidity detected by the turbidity sensor.

9. A method for filtering particles from a quantity of liquid in a dishwashing machine, the method comprising: flowing a gaseous fluid through a predetermined quantity of a liquid mixed with at least one of a foam-forming substance and cleaning agents in a container so as to generate a foam layer with the foam layer having filter properties in that the foam layer filters out from a dishwashing liquid passed through the foam layer at least a fraction of particles entrained with the dishwashing liquid; and trickling a dishwashing liquid having particles entrained therewith downwardly through the foam layer, wherein at least a fraction of the particles are retained in the foam layer, while collecting below the foam layer the quantity of dishwashing liquid from which the fraction of particles have been disentrained; detecting a turbidity of the dish washing liquid; and varying the foam layer to match a degree turbidity detected by the turbidity sensor.

10. The dishwashing machine according to claim 1, wherein the means for producing the foam layer produces a flow of a gaseous fluid through the predetermined quantity of the liquid so as to generate the foam layer.

11. The method according to claim 6, wherein the foam layer is generated by flowing a gaseous fluid through a predetermined quantity of a liquid mixed with at least one of a foam-forming substance and cleaning agents in a container.

* * * * *

UNITED STATES PATENT AND TRADEMARK OFFICE
CERTIFICATE OF CORRECTION

PATENT NO.        : 8,708,160 B2                                                                Page 1 of 1
APPLICATION NO. : 10/582921
DATED             : April 29, 2014
INVENTOR(S)       : Dedegil et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1567 days.

Signed and Sealed this

Twenty-ninth Day of September, 2015

Michelle K. Lee
*Director of the United States Patent and Trademark Office*